United States Patent [19]

Fuhrer

[11] 4,232,340
[45] Nov. 4, 1980

[54] DEFECT COMPENSATION FOR COLOR TELEVISION

[75] Inventor: Jack S. Fuhrer, Carmel, Ind.

[73] Assignee: RCA Corporation, New York, N.Y.

[21] Appl. No.: 44,532

[22] Filed: Jun. 1, 1979

[51] Int. Cl.³ .............................................. H04N 5/76
[52] U.S. Cl. ........................................ 358/167; 358/8; 358/36; 360/38
[58] Field of Search ..................... 358/8, 21, 36, 160, 358/167; 360/38; 328/162

[56] References Cited

U.S. PATENT DOCUMENTS

| 2,996,576 | 8/1961 | Dolby | 360/38 |
|---|---|---|---|
| 3,347,984 | 10/1967 | Holmberg | 360/38 |
| 3,366,732 | 1/1968 | Holmberg | 360/38 |
| 3,461,230 | 8/1969 | Hodge et al. | 360/38 |
| 3,463,874 | 8/1969 | Hodge et al. | 360/38 |
| 3,699,246 | 10/1972 | Hodge | 360/38 |
| 4,001,496 | 1/1977 | Clemans et al. | 360/38 |
| 4,038,686 | 7/1977 | Baker | 360/38 |
| 4,122,489 | 10/1978 | Bolger et al. | 360/38 |

*Primary Examiner*—John C. Martin
*Attorney, Agent, or Firm*—E. M. Whitacre; A. L. Limberg; E. P. Herrmann

[57] ABSTRACT

A defect compensation circuit which substitutes a portion of delayed signal information for a real-time signal defect. A capacitor passes the a-c component of the delayed signal and stores the d-c component of the real-time signal to preclude the occurrence of d-c shifts upon effecting the substitution of signal.

7 Claims, 5 Drawing Figures

DEFECT COMPENSATION FOR COLOR TELEVISION

This invention relates to a defect compensator which may be used to provide compensation for defects in the reproduction of television signals and, more particularly, to provide such compensating without objectionable shifts in reference levels for luminance.

Television signals derived from transmission and receiving systems or recording media such as video discs or magnetic tape frequently include defects which cause disturbances when reproduced as images at the television receiver. The disturbances appear as black and white streaks or flashes on the viewing screen. The source of the signal defects may be electrical interference with regard to transmitted signals, or in the case of recorded signals may be due to blemishes or voids in the recording medium.

Defect compensators of the prior art have operated on the principle that information present on the screen of a television receiver occurs in segments each of which comprises horizontal scan lines of information not likely to differ greatly from the preceding line. It is usually possible to correct defects in the real-time video signal by substituting information from a previous line with so little loss in picture quality as not to be obviously noticeable to the viewer. To accomplish this the real-time signal is sampled and stored in a delay line for the period of one horizontal line so that signal is continuously available to substitute for a defect in the real-time signal.

The delayed and substituted signal tends to have a d-c component somewhat different from the real-time signal. The difference in d-c potential, when rapidly inserted to correct a defect, generates a step function change in signal which is manifested as a brighter or darker spot or streak when observed on the viewing screen. This undesirable effect is avoided in the present invention by using only the a-c components of delayed signals in substituting for defects. This a-c signal is superimposed on the d-c component which was present in the real-time signal just before the defect is detected.

IN THE DRAWINGS

Figure 1:
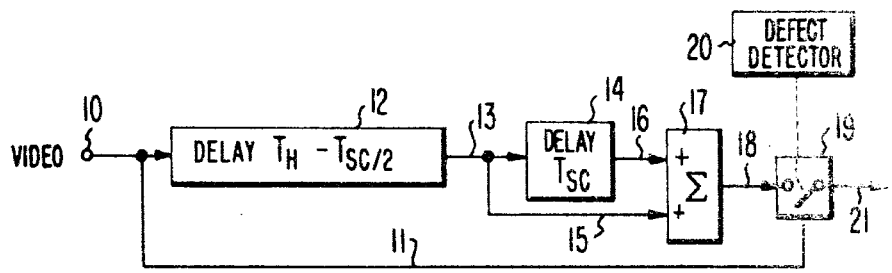
FIG. 1 is a schematic diagram (in block form) of a defect compensation circuit applicable to color television systems.

Referring to FIG. 1, real-time video signal, i.e., the most recently available signal from either a recording or a transmission medium, having signal defects or dropouts is applied to input terminal 10 of the defect compensation circuit. This real-time video signal is a composite video signal comprising both luminance and chroma information. Corrected video signal is to be available at output terminal 21. Defect detection circuit 20, an example of which is described in "Defect Detection and Compensation Apparatus for Use in an FM Signal Translating System" issued to J. K. Clemens, et al. on Jan. 4, 1977, is arranged (by means not shown) to detect defects in the video signal at a point in the overall system ahead of input terminal 10 for producing control pulses correctly timed to control the switch 19. Switch 19 selectively applies real-time video signal available on connection 11 or delayed and phase-compensated video signal available on connection 18 to output terminal 21 for subsequent processing and eventual display.

Delay circuits 12 and 14 and signal averaging circuit 17 make available at connection 18 a video signal suitable for being substituted for real-time video signal whenever a defect is detected.

To facilitate description, the circuit of FIG. 1 will be explained in terms of the NTSC television system. NTSC video signals comprise a luminance signal with a bandwidth from zero Hertz to 4.5 MHertz and a chroma subcarrier at 3.58 MHertz. The period $T_H$ of one signal segment or one horizontal line of signal information is 63.5 microseconds and the period $T_{sc}$ of the chroma subcarrier is 0.28 microseconds. As an incident to the interlacing of two fields of information to create one frame of display information the chroma subcarrier on alternate lines has an exactly 180° phase difference with respect to the edge of the line synchronization pulse. It will be appreciated, however, by those skilled in the art, that the present invention has application to other video signal standards--notably the buried-chroma-subcarrier standard used in home television tape recording--and the scope of the invention is such as to encompass operation to such alternative video signal standards.

Delay element 12 receives video information from input terminal 12 and causes it to appear $T_H - \frac{1}{2}T_{sc}$ seconds later at connection 13. Delay element 14 receives the delayed signal from element 12 and delays it an additional $T_{sc}$ seconds. Signal at connection 16 is delayed a total of $T_H + (T_{sc}/2)$ seconds. The signals at connections 13 and 16 are respectively ahead and behind an exact one line delay period by one-half cycle of the chroma subcarrier frequency. Therefore, the chroma signals available at connections 13 and 16 are both 180° out of phase with signal delayed for the period $T_H$ and are both in phase with the chroma signal of the real-time video signal. The luminance signal available at connections 13 and 16 is also advanced and delayed respectively from exactly one-line delay. But considering the maximum luminance signal frequency to be, for practical purposes, less than 3.5 MHertz with a corresponding period of approximately 0.286 microseconds, the respective advance and delay of ($T_{sc}/2$) or 0.14 microseconds is of small consequence.

Summation circuitry 17 combines the signals delayed by ($T_H - (T_{sc}/2)$) seconds and $T_H + (T_{sc}/2)$ seconds to generate a signal at connection 18 proportional to their average value. Considering that the difference occurring in the signals must have occurred in finite time, especially due to system bandwidth restrictions, the average signal is the time averaged signal occurring at $T_H$. The effect is to insignificantly blur images having a vertical edge produced on the viewing screen with a deviation in color which is not detectable by the human eye.

Each of the delay elements 12 and 14 may be any one of a number of device types. For example, both may be charge transfer devices (CTD), e.g., charge coupled devices (CCDs) or bucket brigade devices (BBDs) of the serial or serial-parallel type. An alternative analog signal delay device is the surface acoustic wave (SAW) device. Where delay elements 12 and 14 are realized with charge transfer devices, they may be subsumed in a single device having signal tapping points to produce signals with the requisite delays. This is indicated in block form in FIG. 2.

CTD delay line 34 responsive to clocking signals generated by drive circuit 35 receives analog signal from connection 33 and produces that signal delayed by a first period ($T_H - T_{sc}/2$ at a first tap output connection 36, delayed by a second period ($T_H$) at a second tap output connection 37, and delayed by a third period ($T_H + T_{sc}/2$) at serial output connection 42. The first and third delay signals are averaged by the summing amplifier circumscribed in dashed block 17.

Figure 2:
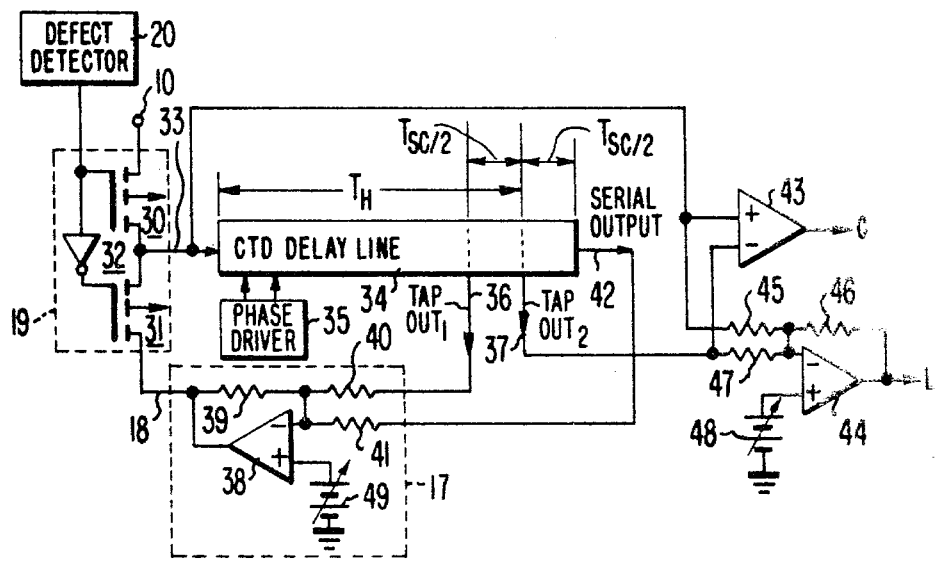
FIG. 2 is a schematic diagram (partially in block form) further specifying the FIG. 1 system.

The FIG. 2 circuit differs from the FIG. 1 circuit in that defect-corrected video is directed into the delay element by the switch means circumscribed by dashed block 19. This is an instance of employing the delay element to comprise a portion of the defect compensation function and also a portion of a signal filtering function. The result is that defects in the real-time signal are substituted by corrected signal rather than merely previous signal. Tapped charge transfer devices are particularly suited for this application due to the relative ease that a desired delay can be achieved merely by selection of particular tap position. By virtue of the delay being effected by sequential clocking the signals available at differing taps are constrained to be in phase and thereby facilitating active filtering techniques and the signal averaging. Furthermore, additional taps may be added (in the design stages) at little extra cost or inconvenience. Taken together the combined filtering and substitution circuitry results in a substantial device parts saving and superior performance.

Delay line 34 is tapped to produce a signal available at connection 37, delayed by $T_H$. Differential amplifier 43 responsive to video signal delayed by $T_H$ and current video signal, differentially sums the essentially redundant luminance information and the 180° phase differing chroma information to produce a signal which is substantially chroma information, stripped of the luminance signal. Summing amplifier 44 responsive to the current and delayed video signals produces a signal which is substantially luminance information stripped of the chroma subcarrier.

Switch means 19 as shown in FIG. 2 comprises p-channel enhancement type field effect transistors 30 and 31 controlled by defect detector 20. Owing to inverting amplifier 32, transistor 31 is caused to be conducting while 30 is non-conducting and to be non-conducting while 30 is conducting. Transistor 30, when conditioned to conduct, selectively applies signal from terminal 10 to connection 33; and transistor 31, when conditioned to conduct, selectively applies corrected signal from connection 18 to connection 33.

Figure 3:
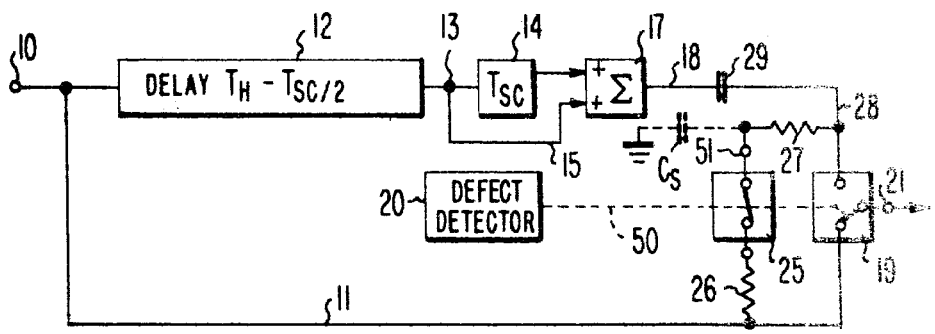
FIGS. 3 and 4 are schematic diagrams (in block form) of defect compensation circuits modified in accordance with the present invention to include means for eliminating undesirable differences in the d-c components between the delayed and current video signals.

The FIG. 3 circuit incorporates means for insuring that differences in the d-c signal component between the delayed video signal and the current or real-time video signal are not translated to output terminal 21. Only the a-c component of the delayed signal available at connection 18 from summation circuitry 17 is applied via capacitor 29 to the switch means 19. Thus d-c level shifts in the delayed signal, resulting from either the delaying or the summation circuits, do not appear on connection 28 to be passed along to affect the compensated signal at output terminal 21.

The d-c component applied to connection 28, to provide compensated signal when the delayed signal is substituted for real-time video, is the d-c potential at connection 28 established by the charge on capacitor 29. The circuit including switch 25 and resistors 26 and 27 selectively provides a charging conduction path between capacitor 29 and real-time video connection 11. Switch 25 is closed concurrently with switch 19 to apply real-time video to output terminal 21. The difference between the d-c components of delayed and real-time video determines the direct current flowing through resistor 27 to adjust the charge stored in capacitor 29. The resistors 26 and 27 in conjunction with stray capacitor $C_S$ constitute a low-pass filter to apply only the d-c real-time component to capacitor 29 and also to prevent delayed a-c video at connection 28 from modulating the connection 11 when switch 25 is closed.

Switch 25 is open during the periods that delayed composite video signal with lone delay is applied to terminal 21 via switch 19. The d-c stored on capacitor 29 at connection 28 is nearly identical to the real-time video at the time of switching but subsequently begins to decay due to current leakage paths and the input bias requirement of the circuit first subsequent to terminal 21. A small potential decay can be tolerated as it is manifested by only a gradation of brightness along the line displayed, which is preferable to an abrupt change in brightness that would occur from an abrupt d-c shift. The discharge time constant should be relatively long with respect to the duration of the longest defect anticipated in the video signal. The value of the impedance connected at terminal 21 is determinative of the size of capacitor 29.

Defect detection circuit 20 may simultaneously control switches 25 and 19. It is often advantageous to control switch 25 by an alternate control means, however, to prevent blanking or sync pulses on the video signal from charging capacitor 29 where the charging time constant of the series circuit including switch 25 is relatively short.

Figure 4:
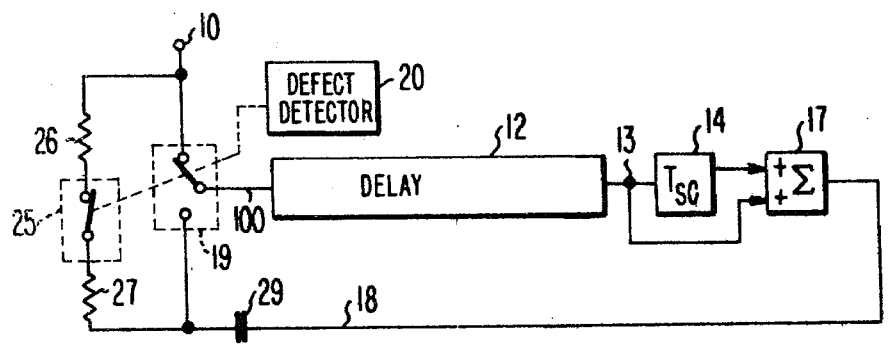
Figure 5:
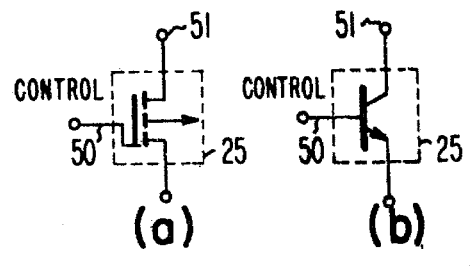
FIGS. 5a and 5b are schematics of representative, alternative transistor realizations of switch 25 of the FIG. 3 defect compensation circuit.

The FIG. 4 circuit illustrates how the d-c compensation is applied to a circuit implemented as in FIG. 2 wherein signal defects are corrected with previously compensated signal. The output signal from the delay and summing circuits is selectively applied by switch 19 responsive to defect detector 20 to the input terminal 100 of delay element 12 when defects are present at video input terminal 10. The d-c component of real time video is applied via the serially connected circuit including switch 25 to capacitor 29 where it superposes with the a-c component of the defect corrected signal for recirculation in the delay circuit. It should be noted that corrected signal is available as output signal at terminal 100 or connections 13 or 18.

While the invention has been couched in terms primarily relating to television systems, the concept is applicable to any one of those systems which substitute information from one source of signal for signal from a second source having a differing d-c potential and the claims should be considered in this light.

What is claimed is:

1. A defect compensation circuit of the type which substitutes a delayed signal for real-time signal defects, including a signal delaying means arranged to respond to the real-time signals to provide a delayed signal a prescribed time thereafter, a defect detection means responsive to the occurrence and to the absence of signal defects in said real-time signal for generating first and second control signal manifestations respectively, an output terminal and first switch means responsive to said first control signal manifestations for applying the real-time signal to said output terminal and responsive to said second control signal manifestations for applying the delayed signal to said output terminal, improved to include means for avoiding undesirable shifts in the d-c component at said output terminal, which means comprises:

means for tracking and retaining the d-c component of the real-time signal applied to said output terminal during said first control signal manifestations and for continuing to apply this d-c component to said output terminal to the exclusion of the d-c component of the delayed signal during said second control signal manifestations.

2. A defect compensation circuit as set forth in claim 1 wherein the means for tracking and retaining the d-c component of the real-time signal during said first control signal manifestations and for continuing to apply this d-c component during second control signal manifestations comprises:

a capacitor having first plate to which said delayed signal is applied and having a second plate; and selectively conductive means responsive to control signals from said defect detection means for applying the real-time signal to the second connection of said capacitor in the absence of real-time signal defects to charge the capacitor to the difference between the d-c potentials of the real-time and delayed signals;

means connecting the second plate of said capacitor to the first switch means for selectively applying the signal at the output terminal during the second control signal manifestations.

3. A defect compensation circuit as set forth in claim 2 wherein the selectively conductive means for applying the real-time signal to the second plate of said capacitor comprises:

first and second resistive means;

second switch means, responsive to said defect detection means for selectively completing a conduction path between first and second circuit nodes in the absence of real-time signal defects;

means connecting the first resistive means for applying real-time signal to the first circuit node; and means connecting the second resistive means between the second circuit node and the second plate of said capacitor.

4. A defect compensation circuit as set forth in claim 3 wherein the second switch means comprises a transistor having first and second electrodes and a principal conduction path therebetween, a control electrode, potential between the first and control electrode controlling said principal conduction path; and wherein the first and second electrodes are respectively connected at the first and second circuit nodes.

5. A defect compensation circuit comprising:

a first terminal for supplying real-time signal liable to contain signal defects;

a signal output terminal from which defect-compensated signal is to be provided;

a signal delaying circuit for delaying and conditioning signal applied to the first terminal, and providing a delayed signal at an output connection thereof;

a capacitor having a first plate connected to the output connection of said signal delaying circuit, and having a second plate;

detection means responsive to the presence of defects in said real-time signal to provide first control signal manifestations and responsive to the absence of defects in real-time signal to provide second and third control signal manifestations;

first switch means for selectively connecting said output signal terminal alternatively to (a) the second plate of the capacitor, responsive to the presence of said first control signal manifestations or (b) the first terminal responsive to the presence of said second control signal manifestations;

second switch means responsive to said defect detection means; and means for selectively connecting the first terminal to the second plate of the capacitor responsive to the third control signal manifestation.

6. A defect compensation circuit comprising:

a signal input terminal;

a signal delaying circuit having an input connection for receiving signal, and providing a delayed output signal at an output connection thereof;

signal defect detecting means responsive to defects in the signal appearing at said signal input terminal for providing control signals;

a capacitor having a first plate connected to the output connection of the delaying circuit for receiving delayed signal from said signal delaying circuit, and having a second plate;

means responsive to the defect detection means for selectively connecting the second plate of the capacitor to the input connection of the signal delaying circuit upon the occurrence of signal defects and alternatively connecting the signal input terminal to the input connection of the signal delaying circuit in the absence of signal defects;

means selectively conductive and responsive to said control signals for connecting the signal input terminal to the second terminal of the capacitor during prescribed periods of defect-free signal at the signal input terminal.

7. A defect compensation circuit as set forth in claim 6 wherein the means selectively conductive comprises:

switch means controlled by the defect detection circuit for completing a direct current circuit between first and second circuit nodes;

first impedance means serially connecting the first circuit node to the signal input terminal; and second impedance means connecting the second circuit node to the second plate of the capacitor.

* * * * *